United States Patent [19]

Graf

[11] Patent Number: 5,402,913

[45] Date of Patent: Apr. 4, 1995

[54] APPARATUS FOR THE METERED DISPENSING OF A FLOWABLE MEDIUM, ESPECIALLY A LUBRICANT

[75] Inventor: Walter Graf, Euerdorf, Germany

[73] Assignee: Satzinger GmbH & Co., Euerdorf, Germany

[21] Appl. No.: 156,564

[22] Filed: Nov. 22, 1993

[30] Foreign Application Priority Data

Dec. 5, 1992 [DE] Germany .................. 42 41 073.8

[51] Int. Cl.⁶ .............................................. B65D 35/00
[52] U.S. Cl. ...................................... 222/63; 222/214; 222/309; 222/644; 184/15.2; 184/39; 417/478
[58] Field of Search ...................... 222/52, 61, 63, 214, 222/309, 333, 394, 644; 184/15.2, 6, 39, 26; 417/478

[56] References Cited

U.S. PATENT DOCUMENTS

| | | | |
|---|---|---|---|
| 3,720,289 | 3/1973 | Moldenhauer | 184/15.2 |
| 4,009,764 | 3/1977 | Hafner | 184/15.2 |
| 4,537,285 | 8/1985 | Brown et al. | 184/15.2 |
| 4,722,372 | 2/1988 | Hoffman et al. | 222/52 X |
| 5,255,822 | 10/1993 | Mease et al. | 222/214 X |
| 5,316,452 | 5/1994 | Bogen et al. | 417/478 X |

*Primary Examiner*—Gregory L. Huson
*Attorney, Agent, or Firm*—Herbert Dubno

[57] ABSTRACT

A dispenser of a flowable medium, especially a lubricant, with a flexible wall tube forming the pumping chamber which is connected to a container for the flowable medium by a check-valve and feeds a dispensing nozzle. The pumping chamber is deformed by a plunger actuated by a lever in turn displaced by a solenoid whose linearly displaceable rod bears upon the lever.

13 Claims, 4 Drawing Sheets

APPARATUS FOR THE METERED DISPENSING OF A FLOWABLE MEDIUM, ESPECIALLY A LUBRICANT

FIELD OF THE INVENTION

My present invention relates to an apparatus for the metered dispensing of a flowable medium, especially a lubricant. More particularly the invention relates to an apparatus of this type which comprises a vessel or receptacle for the flowable medium, a metering pump connected to that vessel and providing a pumping chamber, an outlet nozzle for conveying the dispensed flowable medium connected to that chamber, and an actuating device for displacing the flowable medium from the chamber through the outlet nozzle.

BACKGROUND OF THE INVENTION

The flowable medium with which the present invention is concerned can be considered a practically incompressible fluid which can be relatively liquid, somewhat viscous or even a pasty medium. Generally the flowable medium is a lubricant and the apparatus with which the invention is concerned can be used in various technological fields. For example, it can be used in the chemical industry for the metered feed of a flowable medium to form a mixture therewith, even in the case of nonlubricants. Its most important utilization, however, is for the dispensing of a lubricant, such as an oil or grease, to the moving parts of a machine which require the supply of lubricant thereto.

The prior art apparatus over which the invention is an improvement comprises a tubular segment forming the pumping chamber and connected by a checkvalve to the vessel for the flowable medium, the checkvalve closing upon the buildup of pressure in the pumping chamber.

The actuating device for this system can comprise a squeezing plunger which is movable transverse to the axis of the tube segment and bears upon the wall of the flexible tube to displace that wall inwardly and thereby reduce the volume of the pumping chamber to drive the flowable medium through the nozzle.

The actuating lever can bear upon the plunger. The actuating lever in this earlier system can be actuated by hand and the stroke of the actuation can determine the amount of the flowable medium dispensed for the particular stroke, i.e. the metering action.

In many technological fields, the manual actuation of the actuating lever cannot be effected or can be effected only with difficulty or by creating a dangerous situation. This is especially the case with running machinery, in motor vehicles and for motorcycles, for example. It is desirable to provide a system for lubricating the drive chain of a motorcycle, for example, but manual devices close to the moving chain can endanger the user. It is desirable and indeed mandatory for many applications of a dispenser for flowable materials and especially lubricants, that the apparatus be automatically actuatable.

OBJECTS OF THE INVENTION

It is, therefore, the principal object of the present invention to provide an improved apparatus of the basic configuration described which can effect a metered feed of a flowable medium with very precise dosing thereof with precisely adjusted dosing intervals, whereby drawbacks of earlier systems are avoided.

Another object of this invention is to provide an improved apparatus for metering a flowable medium, especially a viscous or pasty medium such as a lubricant which is precise, reliable and of low cost construction.

SUMMARY OF THE INVENTION

These objects are attained, in accordance with the present invention, by the following combination:
   (a) The metering pump is a comprised of a pumping chamber formed by a tube segment having a flexible wall and connected by a checkvalve to the fluid supply vessel, the checkvalve closing upon pressure buildup in the pumping chamber.
   (b) The actuating device is comprised of a squeezing plunger movable in a direction transverse to the axis of the tube segment to deform the tube segment inwardly and thereby drive the flowable medium into a dispensing nozzle, the squeezing plunger being actuated by a actuating lever and the squeezing plunger and actuating lever being restored, following actuation to their respective original or starting position.
   (c) An actuating electromagnet is provided to cooperate with the actuating lever by an armature or actuating rod bearing upon the actuating lever and also resettable into its initial position. The magnet is preferably a solenoid and the rod is preferably a bar extending through and surrounded by the magnet.

According to the invention, the actuating magnet is controllable by an electrical control circuit in response to time and/or demand for the flowable medium.

The reference to a tube segment is intended to encompass any type of elastically-deformable sleeve.

According to the invention, the resetting of the squeezing plunger to its starting position can be effected by means of the elastic-restoring force of the tube segment, by means of a special restoring spring or both. The resetting of the rod or bar of the actuating electromagnet can be effected by means of magnetic force or spring force or by force transmission from the elastically-restoring tube segment when this restoring force is sufficient.

The advantages of the apparatus of the invention, besides the relatively low cost and high degree of versatility for the dispensing of a wide variety of flowable medium, reside in the replacement of manual actuation as required heretofore with relatively simple automatic actuators, namely, the solenoid system, which is highly reliable and can provide time-dependent and/or fluid-demand-dependent control with the aid of relatively simple electrical-control circuitry.

According to a feature of the invention, the outlet nozzle is connected by means of a pressure relief valve or overflow valve to the pump chamber. A pressure-relief valve of this type is generally spring-loaded and reset by the spring force.

In all cases in which the invention is used and is applicable, the volume of the apparatus which receives the flowable medium upstream of the pump and the flow resistance of the component of the pump including the outlet nozzle can be selected so that upon resetting of the plunger to its original position, no air penetrates into the pump chamber. Naturally upon start-up of the apparatus, any air in the pump chamber and system should be removed by conventional means, e.g. evacuation.

In a preferred embodiment of the invention, the actuating lever has a preselected stroke which determines, in turn, the volume of the flowable medium metered from the nozzle for the stroke. The stroke can be limited by an adjustable stop or abutment which can be controlled or set by a screw which can control the displacement of the actuating lever.

The solenoid can have a predetermined excursion which can be set in one direction by a fixed upper stop and in the opposite direction by the stroke of the actuating lever. In the latter case, all restoring or resetting movements can be effected by the magnet and the stroke of the solenoid can be limited by this magnetic system and optionally by mechanical stops.

The invention can operate with a variety of different fluid receptacles. Especially the fluid receptacle of the invention can be a receptacle in which the flowable medium is maintained under atmospheric pressure. It is also possible to utilize a flowable medium which is under a gas pressure generated within the receptacle as described, for example, in German Patent document DE 42 09 776.2 A1.

It is also possible to utilize modern electrical and electronic control technology to control the solenoid with an adjustable pulse duration of the pulses energizing the solenoid. Such control devices are in the art and it also may be mentioned that the control device for the solenoid magnet also can respond to a timing relay for periodic or cyclical actuation.

The apparatus is especially useful on a motor vehicle and the control device for the solenoid can be directly or indirectly a function of the speed of the engine and/or the speed of the vehicle.

More particularly, an apparatus for the metered dispensing of a flowable material can comprise:
a receptacle for the flowable material;
a metering pump formed with a pumping chamber connected to the receptacle and receiving the flowable material therefrom, the metering pump comprising:
a section of a flexible-wall tube defining the chamber,
a checkvalve connecting the chamber with the receptacle and closing upon pressure in the chamber exceeding pressure in the receptacle, and
a plunger displaceable against the wall for contracting the chamber to displace the flowable material therefrom;
an outlet nozzle connected to the chamber for receiving flowable material displaced therefrom and delivering the flowable material; and
actuating means operatively connected to the plunger for displacing same, the actuating means including:
an actuating lever displaceable relative to the pump and acting upon the plunger for displacing same, the lever being restored to an initial position following displacement of the plunger to contract the chamber, and
an electromagnetic device responsive to a control signal and operatively connected to the actuating lever for displacing same at least from the initial position into an actuated position to displace the lever.

BRIEF DESCRIPTION OF THE DRAWING

The above and other objects, features and advantages of the invention will become more readily apparent from the following description, reference being made to the accompanying highly diagrammatic drawing which.

SPECIFIC DESCRIPTION

Figure 1:
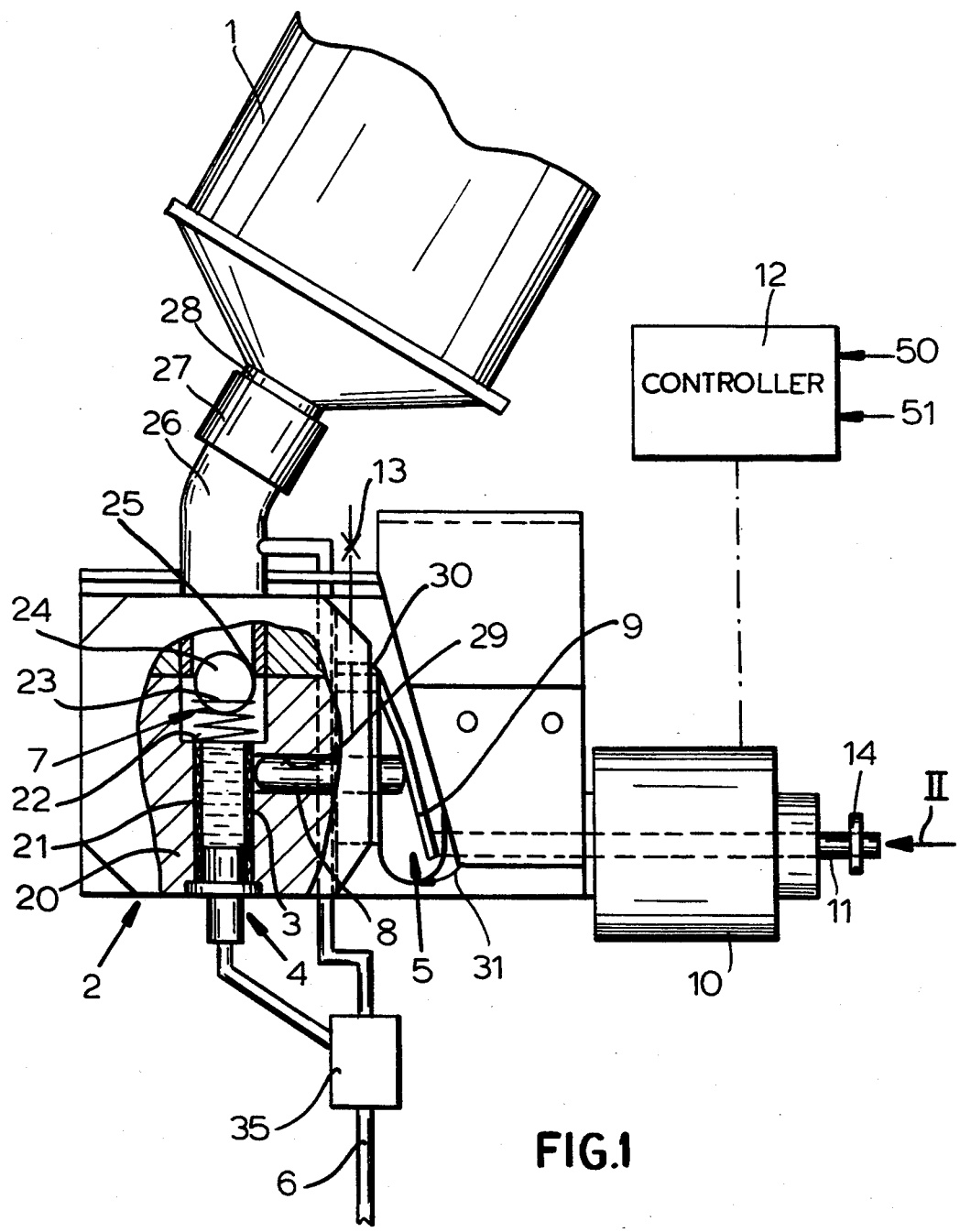
FIG. 1 is a side elevational view, partly broken away of an apparatus according to the invention showing a solenoid as the stroke magnet, i.e. the actuating magnet having a linear action.
Figure 2:
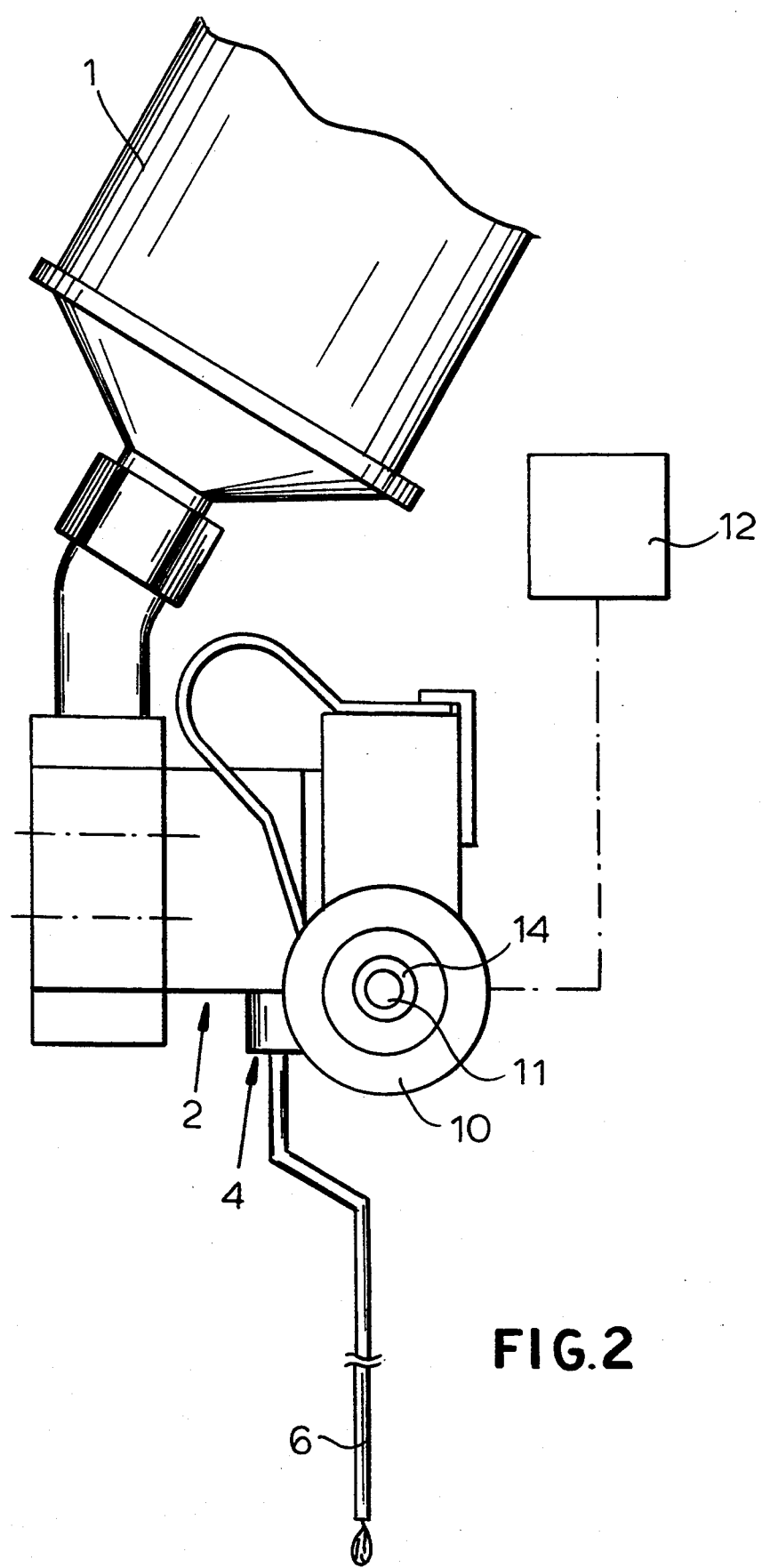
FIG. 2 is a view of the embodiment of FIG. 1 as seen in the direction of the arrow II of FIG. 1.
Figure 3:
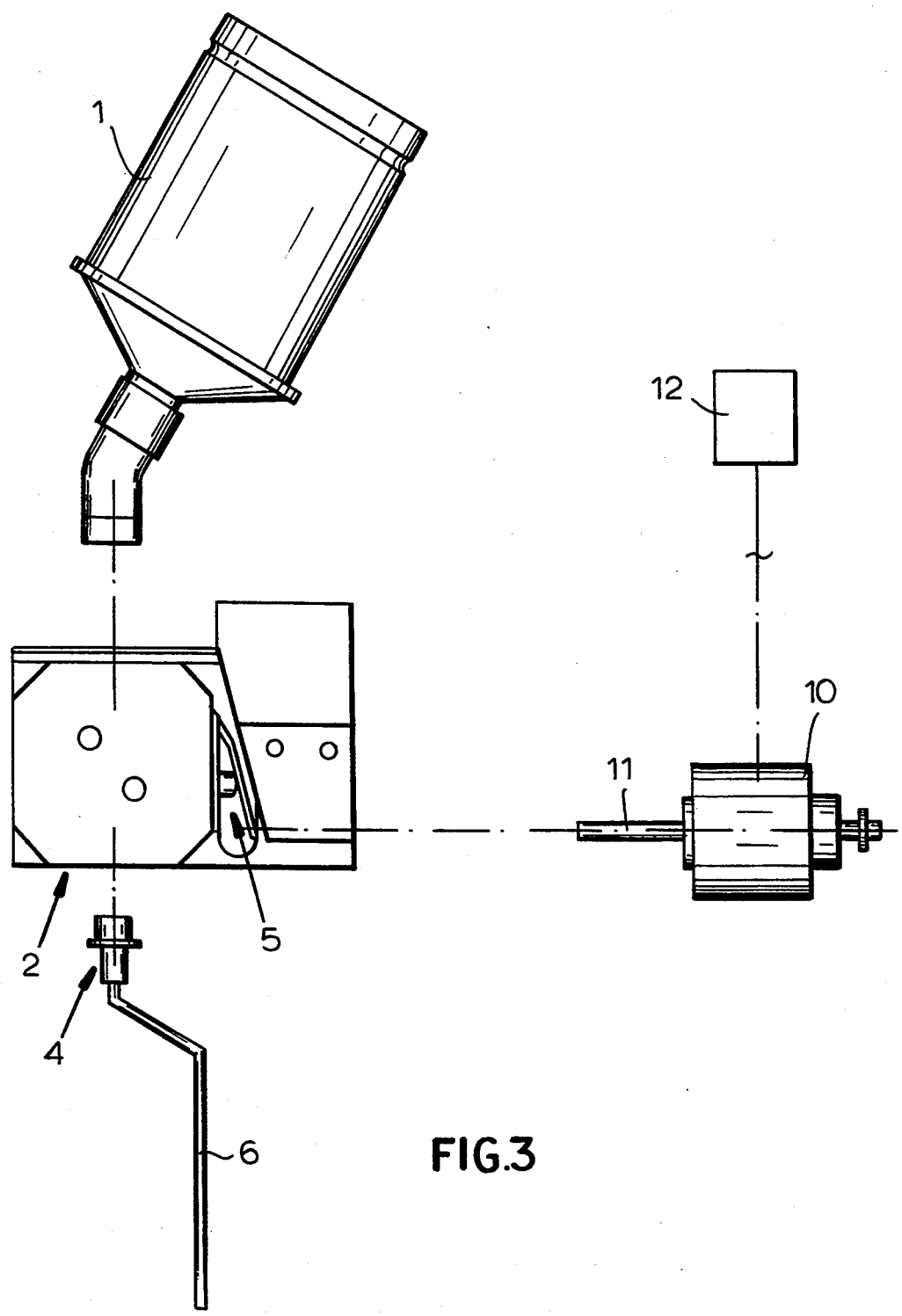
FIG. 3 is a view of the apparatus of FIGS. 1 and 2, drawn to a smaller scale, but with the parts thereof shown slightly separate from one another in an exploded view.

The apparatus shown in the drawing can be employed for the metered dispensing of a flowable medium, especially a lubricant such as an oil or grease. Basically that apparatus includes a flowable medium container 1, a metering pump 2 communicating with that container and providing a pumping chamber 3, an outlet or dispensing nozzle 4 and an actuating device generally represented at 5 for the metering pump.

In the embodiment illustrated, the outlet nozzle 5 for the flowable medium is a dispensing needle 6.

The metering pump 2 can have its pumping chamber 3 formed by a flexible wall tubular member or hose segment which is connected by a checkvalve 7 to the vessel 1 for the flowable medium, the checkvalve closing upon a pressure buildup in the pumping chamber 3.

The actuating device 5 can comprise a squeezing plunger 8 which is displaceable perpendicular to the axis of the tube segment 3 and which, for that purpose, is slidable in a housing 20 having a bore 21 aligned by the tubular segment 3 and formed with a shoulder 22 against which the checkvalve spring 23 is seated. The checkvalve can comprise a ball 24 biased by the spring 23 against a seat 25 provided around a duct 26 having a female threaded fitting 27 onto which the male threaded mouth 28 of the vessel 1 can be screwed. The body 20 is further formed with a transverse bore 29 in which the plunger 8 is slidable at a fulcrum 30 on the body 20, an actuating lever 9 can be pivotally mounted and can bear, intermediate its length, upon the plunger 8.

When the lever 9 is displaced in the direction represented by the arrow 31, i.e. in a clockwise sense, it presses the plunger 8 to the left to deform the tubular segment 3 and contract the interior of the tubular segment which is filled with the lubricant. Since the checkvalve 7 closes, the contraction of the pumping chamber can only result in a forcing of the substantially incompressible lubricant through the outlet nozzle 4 and the needle 6.

Figure 4:
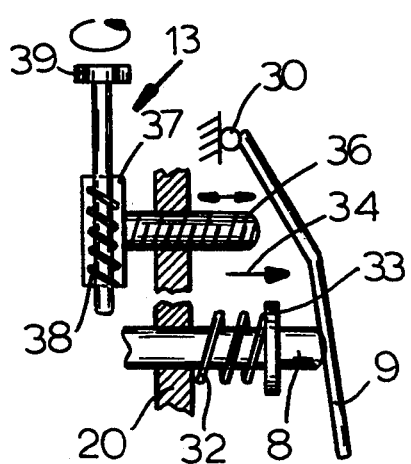
FIG. 4 is a detail view illustrating a mechanism for controlling the style of the lever of the system of FIGS. 1–3.

The plunger 8 and the actuating lever 9 can be resettable into their original positions shown by the intrinsic resiliency of the tube segment 3 or a restoring spring. For example, in FIG. 4 I have shown a restoring spring 32 braced against the body 20 and engaging a disk or collar 33 formed on the plunger 8 and urging the plunger in the direction of the arrow 34. A restoring spring can also be provided for the lever 9 if desired, independently of the restoring spring for the plunger.

To displace the actuating lever 9, a stroke-type magnet 10, i.e. a solenoid acting upon a rod 11 can be provided. The rod can be reset into its original position by the spring, e.g. spring 32, by a separate spring acting upon the rod or indirectly through the plunger 8 and the lever 9, by the resiliency of the tube segment 3.

The magnet 10 is operated by an electrical control unit which can be a time-dependent controller or a demand-type controller responding to the demand for the lubricant at the machine part which is lubricated.

The dispensing nozzle 4 is connected by a spring-loaded pressure relief valve 35 to the pumping chamber 3 as can be seen in FIG. 1.

Although not specially illustrated, it can be seen that volume of the flowable medium in the flow direction behind the pump chamber 3, the flow resistance of the components including that of the outlet nozzle 4 and the location and orientation of the vessel 4 are such that, upon the restoring of the plunger 8 to its inactive position shown, no air is drawn into the pumping chamber.

With the apparatus of the invention, the metering can be controlled in a very simple and reliable manner by, for example, limiting the displacement of the lever 9 by an adjustable abutment system 13 represented diagrammatically in FIG. 1 but which includes a screw 36 adapted to form a stop for the lever 9 (FIG. 4) and having a wormwheel 37 driven by a worm 38 of the adjustment mechanism whose milled knob 39 can be rotated to set the abutment or stop 36 for the lever.

The invention also provides an especially simple solenoid 10 which can have a predetermined stroke fixed, for example, by a fixed upper abutment 10 in the form of a collar mounted upon the rod 11.

The stroke of the rod 11 can also be controlled mechanically or through the use of the coil system and other mechanical stops if desired.

Figure 5:
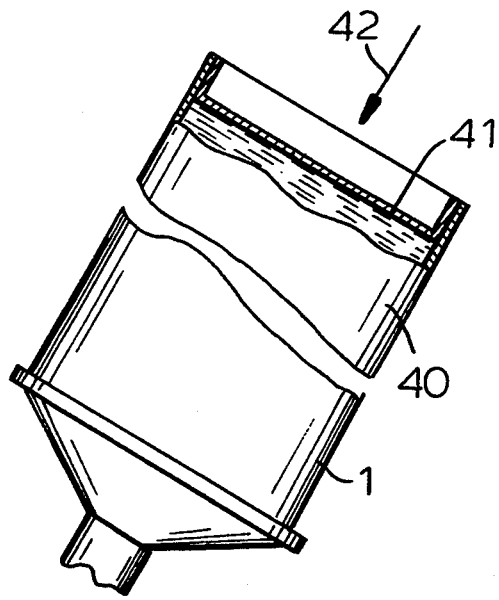
FIG. 5 is an elevational view, partly broken away of one type of receptacle for supplying the flowable medium to the pumping chambering embodiment like that of FIGS. 1–3.
Figure 6:
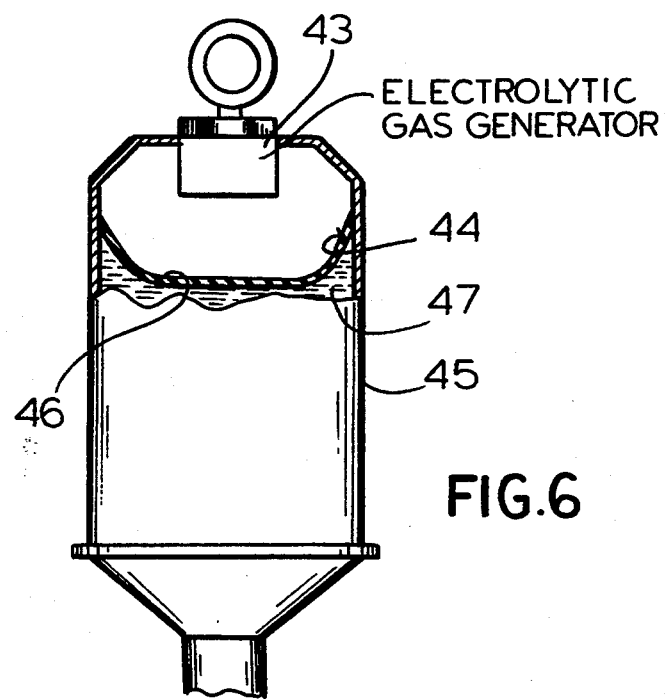
FIG. 6 is an elevational view, partly broken away, showing another embodiment of a receptacle for supplying a flowable medium but utilizing gas pressure generated in situ within that vessel.

As can be seen from FIG. 5, the fluid container or vessel 1 may be filled with the lubricant 40 which can be under the pressure of a piston 41 exposed to atmospheric pressure as represented by the arrow 42. It is also possible, if desired, to provide an electrolytic gas generator 43 in a compartment 44 of a vessel 45 feeding the lubricant to the pump chamber. In that case, a flexible membrane 46 can be provided between the gas chamber 44 and the chamber 47 containing the flowable medium. In this case, the pressure generated within the vessel 45 can drive the flowable medium into the pump chamber.

The electrical control device 12 is so selected that it provides the quantity of lubricant or the rate of flow of the lubricant which may be required. It may constitute a source of electrical pulses with adjustable pulse duration with or without a cyclically-operated timing relay or can be any duration regulated directly or indirectly in response to the speed of an engine or the speed of a vehicle, inputs being provided at 50 and 51 for this purpose.

I claim:

1. An apparatus for the metered dispensing of a flowable material, said apparatus comprising:
    a receptacle for said flowable material;
    a metering pump formed with a pumping chamber connected to said receptacle and receiving said flowable material therefrom, said metering pump comprising:
        a section of a flexible-wall tube defining said chamber,
        a checkvalve connecting said chamber with said receptacle and closing upon pressure in said chamber exceeding pressure in said receptacle, and
        a plunger displaceable against said wall for contracting said chamber to displace said flowable material therefrom;
    an outlet nozzle connected to said chamber for receiving flowable material displaced therefrom and delivering said flowable material; and
    actuating means operatively connected to said plunger for displacing same, said actuating means including: an actuating lever displaceable relative to said pump and acting upon said plunger for displacing same, said lever being restored to an initial position following displacement of said plunger to contract said chamber and
    an electromagnetic device responsive to a control signal and operatively connected to said actuating lever for displacing same at least from said initial position into an actuated position to displace said lever said electromagnetic device including a linearly displaceable rod, and a solenoid receiving said rod and imparting a linear stroke thereto, said rod bearing upon said lever.

2. The apparatus defined in claim 1, further comprising a time-dependent controller connected with said electromagnetic device for transmitting time-dependent signals thereto.

3. The apparatus defined in claim 1, further comprising a controller connected with said electromagnetic device and responsive to demand for said flowable material for producing said signals.

4. The apparatus defined in claim 1, further comprising a pressure-relief valve connecting said nozzle with said chamber.

5. The apparatus defined in claim 1, wherein a stroke of said lever determines an amount of said flowable material to be metered by the apparatus, said apparatus further comprising at least one adjustable stop for said lever for controlling a stroke thereof.

6. The apparatus defined in claim 5 wherein said stop is adjustable by adjustment of a screw.

7. The apparatus defined in claim 6 wherein said rod of said electromagnetic device has a predetermined stroke limited by an abutment on said rod and the stroke of said lever.

8. The apparatus defined in claim 1 wherein said magnetic device has a stroke limited by a coil system thereof.

9. The apparatus defined in claim 1 wherein said receptacle is a container under atmospheric pressure.

10. The apparatus defined in claim 1 wherein said receptacle is a container in which a gas pressure is generated.

11. The apparatus defined in claim 1, further comprising a controller connected to said electromagnetic device for pulsed energization thereof with adjustable pulse duration.

12. The apparatus defined in claim 1, further comprising a controller controlled periodically by a timing relay for energizing said electromagnetic device.

13. The apparatus defined in claim 1 which forms part of a motor vehicle having a control device for producing said signals directly or indirectly as a measure of engine speed and/or as a measure of speed of the vehicle.

* * * * *